(12) United States Patent
Bilbao De Mendizabal

(10) Patent No.: US 10,571,303 B2
(45) Date of Patent: Feb. 25, 2020

(54) REDUNDANT FAULT DETECTION DEVICE AND METHOD

(71) Applicant: Melexis Technologies SA, Bevaix (CH)

(72) Inventor: Javier Bilbao De Mendizabal, Zurich (CH)

(73) Assignee: Melexis Technologies SA, Bevaix (CH)

( * ) Notice: Subject to any disclaimer, the term of this patent is extended or adjusted under 35 U.S.C. 154(b) by 0 days.

(21) Appl. No.: 15/944,048

(22) Filed: Apr. 3, 2018

(65) Prior Publication Data

US 2018/0292237 A1    Oct. 11, 2018

(30) Foreign Application Priority Data

Apr. 6, 2017  (EP) .................................... 17165271

(51) Int. Cl.
| | | |
|---|---|---|
| *G01D 5/244* | (2006.01) | |
| *G01D 5/14* | (2006.01) | |
| *B62D 15/02* | (2006.01) | |
| *G01D 5/04* | (2006.01) | |
| *G01B 7/00* | (2006.01) | |
| *G01B 7/30* | (2006.01) | |
| *G01P 3/487* | (2006.01) | |

(52) U.S. Cl.
CPC ......... *G01D 5/145* (2013.01); *B62D 15/0215* (2013.01); *G01B 7/003* (2013.01); *G01B 7/30* (2013.01); *G01D 5/04* (2013.01); *G01D 5/24438* (2013.01); *G01D 5/24461* (2013.01); *G01P 3/487* (2013.01)

(58) Field of Classification Search
CPC .......................... G01D 5/145; G01D 5/24438
See application file for complete search history.

(56) References Cited

U.S. PATENT DOCUMENTS

| | | | |
|---|---|---|---|
| 5,789,658 A * | 8/1998 | Henn | .................. F02D 41/0097 |
| | | | 73/1.37 |
| 2005/0127899 A1 | 6/2005 | Kakuta et al. | |
| 2005/0151535 A1 | 7/2005 | Hagino et al. | |
| 2008/0051961 A1* | 2/2008 | Ebashi | ............... B62D 15/0215 |
| | | | 701/41 |

(Continued)

FOREIGN PATENT DOCUMENTS

| | | |
|---|---|---|
| EP | 1437575 A1 | 7/2004 |
| EP | 1830155 A1 | 9/2007 |
| EP | 1892498 A1 | 2/2008 |

OTHER PUBLICATIONS

European Search Report from EP Application No. 17165271.2, dated Jul. 7, 2017.

(Continued)

*Primary Examiner* — Son T Le
*Assistant Examiner* — Adam S Clarke
(74) *Attorney, Agent, or Firm* — Workman Nydegger

(57) ABSTRACT

An integrated circuit for error detection comprises an input for receiving two signals, in which a first signal is representative of a physical quantity in a first range and a second signal is representative of the physical quantity in a second range. The first range and second range are different ranges that overlap. The circuit comprises a processor configured to detect an inconsistency between the two signals by taking said first and second range into account, in which this inconsistency is indicative of an error.

14 Claims, 2 Drawing Sheets

(56) References Cited

U.S. PATENT DOCUMENTS

| | | | |
|---|---|---|---|
| 2009/0021246 A1* | 1/2009 | Uehira | B62D 15/0215 |
| | | | 324/207.25 |
| 2010/0060272 A1 | 3/2010 | Tanaka et al. | |
| 2010/0301845 A1 | 12/2010 | Acker | |
| 2013/0328550 A1* | 12/2013 | Sebastiano | G01B 7/023 |
| | | | 324/207.12 |
| 2014/0028294 A1* | 1/2014 | Granig | G01D 5/145 |
| | | | 324/207.12 |
| 2014/0352396 A1 | 12/2014 | Rauh et al. | |
| 2015/0226581 A1 | 8/2015 | Schott et al. | |

OTHER PUBLICATIONS

European Search Report from EP Application No. EP18164283.6, dated Aug. 23, 2018.

* cited by examiner

REDUNDANT FAULT DETECTION DEVICE AND METHOD

FIELD OF THE INVENTION

The invention relates to the field of integrated circuits. More specifically, it relates to an integrated circuit for error detection, to a magnetic position sensor unit and to a related method for error detection.

BACKGROUND OF THE INVENTION

Various applications require a sensor to detect a physical quantity, such as a position, e.g. a linear or angular position of an object. It is known in the art to measure a magnetic field property of a magnetic field, e.g. using a magnetic sensor, in combination with a magnetic field generating and/or influencing element, e.g. a magnetized object or an object that alters a magnetic field. The magnetic sensor and this element may be typically arranged such as to be movable, e.g. rotatable and/or translatable, with respect to each other. Thus, the magnetic sensor may measure a property of the magnetic field emanating from or influenced by the object, in which this property is indicative for the relative position and/or orientation of the element with respect to the sensor. For example, a linear position sensor may determine the position of an object on a linear path relative to the sensor, and an angular sensor may determine an angular orientation of an object relative to the sensor.

The property of the magnetic field being measured may be the strength of the magnetic field, which can be directly measured, for example by Hall sensor elements. Another property may be the magnetic flux, which may be measured indirectly, e.g. by an induced current. For example, an inductive sensor element may be used, such as a coil. It is also known in the art to measure the strength of one or more magnetic field components, e.g. the projection(s) of the magnetic field vector in a particular direction(s).

Furthermore, more than one property of the magnetic field may be measured, and/or such property or properties may be measured in multiple sensing locations. The plurality of measurements may then be combined and/or processed to determine the position information of interest.

For example, it is known in the art to determine an angle of a shaft using a magnetic sensor. In such prior art devices, a magnet may be mechanically linked to a gear wheel, and a magnetic sensor is used to determine the angular position of the magnet. Different magnetic sensors may detect the magnetic fields of corresponding magnets linked to the shaft via corresponding gear wheels, in which each gear wheel has a different gear transmission ratio with respect to a hub gear wheel mechanically connected to the input shaft. Thus, such magnetic sensors may use the nonius principle to achieve an accurate angle determination.

In another example, US 2015/226581 discloses an arrangement for measuring an angular position of a rotor with respect to a stator. This arrangement comprises a multi-pole magnet mounted on the rotor, a sensor mounted on the stator and a plurality of sensor elements organized in two groups or four groups for measuring a magnetic field component. A method for calculating the angular position based on the signals of the elements of each group is disclosed. Thus, a magnetic sensor can be provided that measures a magnetic field of a multipole magnet, while being substantially insensitive to a dipole field.

In a different example, US 2005/0151535 discloses a magnetic linear position sensor that comprises a first yoke and a first and second magnet on the first yoke. Surfaces of the first magnet and the second magnet, inclined in opposite directions, respectively form a magnetic north pole and a magnetic south pole. A second yoke is placed at a position opposing the first and second magnet, separated by an air gap. A magnetoelectric transducer is placed in the air gap to sense the linear position.

SUMMARY OF THE INVENTION

It is an object of embodiments of the present invention to provide good and efficient error detection, e.g. for a (magnetic) position sensor unit, e.g. for detecting a fault condition of a sensor unit.

It is an advantage of embodiments of the present invention that a fault condition can be detected in a sensor unit based on the output signals of the unit.

It is an advantage of embodiments of the present invention that a plausibility check is provided to validate the output signals of a sensor unit.

It is an advantage of embodiments of the present invention that the fault detection coverage of a magnetic position sensor unit, e.g. a prior-art magnetic position sensor unit, can be easily improved without requiring complex and/or costly modifications in the sensor unit.

For example, sensor elements and/or readout circuits which are already required for providing a position output, e.g. to provide robustness against external influences of the determined position and/or to extend the range in which the position can be determined, can be advantageously used without substantive modification to detect a fault in the sensor elements and/or readout circuits.

The above objective is accomplished by a method and device according to the present invention.

In a first aspect, the present invention relates to an integrated circuit for error detection. The integrated circuit comprises an input for receiving two signals, in which a first signal of the two signals is representative of a physical quantity in a first range and a second signal of the two signals is representative of that same physical quantity in a second range. The first range and the second range are different ranges that overlap.

For example, a ratio of the first range over the second range is equal to a ratio of the derivative of the second signal versus the physical quantity over the derivative of the first signal versus the physical quantity. For example, the physical quantity may refer to an angular position, where the first range may, for example, be 180° (e.g. provided by a quadrupole field measurement) and the second range may, for example, be 360° (e.g. provided by a dipole field measurement). In this example, the ratio between the ranges would be equal to ½. The signals, being representative of magnetic fields, may change, for a unit change of the angular position, by respectively a 2° shift of the phase of the first signal and a 1° shift of the phase of the second signal.

The integrated circuit also comprises a processor configured to detect an inconsistency between the two signals by taking the first and second range into account, in which this inconsistency is indicative of an error.

In an integrated circuit in accordance with embodiments of the present invention, the processor may be configured to compare the first signal with the second signal after a suitable transformation of either or both of the first signal and the second signal into the first range, into the second range or into a common third range, in which said transformation or transformations take the first range and the second range into account, for example by taking a ratio or a difference of the first range and the second range into account.

In an integrated circuit in accordance with embodiments of the present invention, the processor may be configured to calculate a first value representative of the physical quantity based on the first signal by taking the first range into account and to calculate a second value representative of the physical quantity based on the second signal by taking the second range into account.

In an integrated circuit in accordance with embodiments of the present invention, the processor may be adapted for detecting the inconsistency between the two signals by comparing the first value and the second value.

In an integrated circuit in accordance with embodiments of the present invention, the integrated circuit may be adapted for error detection of a position sensor unit, e.g. a magnetic position sensor unit. The processor may be configured to detect the inconsistency as being indicative of an error in the position sensor unit. The input may be adapted for receiving the two signals from the position sensor unit. The physical quantity may be a position of a target.

In an integrated circuit in accordance with embodiments of the present invention, the processor may be adapted to determine the position in the form of an angle in an angular range that exceeds a single rotation.

In an integrated circuit in accordance with embodiments of the present invention, the two signals, i.e. the first signal and the second signal, may relate to the physical quantity via a different periodicity of the two signals as a function of the physical quantity.

In an integrated circuit in accordance with embodiments of the present invention, the first value may represent the physical quantity modulo a first period corresponding to the periodicity of the first signal and wherein the second value may represent the physical quantity modulo a second period corresponding to the periodicity of the second signal. For example, the first value, and/or the second value, may reiterate over a same value range for each period, such that, when the physical quantity exceeds the limit of that range, the value wraps back around to the beginning of the value range.

In an integrated circuit in accordance with embodiments of the present invention, the first period may be an integer multiple of the second period or a non-integer multiple of the second period.

In an integrated circuit in accordance with embodiments of the present invention, the first signal may be a first periodic function of the physical quantity and the second signal may be a second periodic function of the physical quantity. The first periodic function and the second periodic function may have a same functional form after respectively transforming the physical quantity by a first transformation and by a second transformation.

In an integrated circuit in accordance with embodiments of the present invention, the first transformation and the second transformation may correspond to a scaling of the physical quantity after, optionally, applying an offset, in which a multiplicative factor corresponding to the scaling and an offset term corresponding to the offset both differ between the first transformation and the second transformation or at least in which the multiplicative factor differ between the first transformation and the second transformation.

In a second aspect, the present invention relates to a position sensor for determining a position of a target. The position sensor comprises an integrated circuit in accordance with embodiments of the first aspect of the present invention and a magnetic position sensor unit for generating the two signals and for providing the two signals to the integrated circuit via the input.

In a position sensor in accordance with embodiments of the present invention, the magnetic position sensor unit may comprise a plurality of inductive sensor elements for indirectly measuring, via properties of induced electric currents in the inductive sensor elements, magnetic field properties at a plurality of locations. The integrated circuit may be adapted for determining the position of the target based on the measured properties of the induced electric currents.

For example, the magnetic position sensor unit may combine a plurality of sensor signals in a plurality of distinct combinations to provide the first signal and the second signal. Thus, the first signal and the second signal may be derived from a common set of sensing elements, e.g. combined differently by different linear combinations, or derived from at least a common set of sensing elements. Such common set of sensing elements may refer to, for example, at least two (e.g. at least four, e.g. at least six, e.g. at least eight) Hall sensors or magnetoresistive sensors, or at least two (e.g. at least four, e.g. at least five, e.g. at least six, e.g. at least seven) inductive sensors.

In a position sensor in accordance with embodiments of the present invention, the magnetic position sensor unit may comprise a plurality of Hall elements for measuring magnetic field properties at a plurality of locations. The integrated circuit may be adapted for determining the position of the target based on the measured magnetic field properties.

In a position sensor in accordance with embodiments of the present invention, the magnetic position sensor unit may comprise a magnetic sensor for detecting two different orders of a multipole expansion of a magnetic field and for generating the two signals as indicative of the two different orders of the multipole expansion, and a magnetic assembly for forming at the location of the magnetic sensor a first magnetic field component having a first multipole order of the two different orders of multipole expansion. The first magnetic field component may be rotatable relative to the magnetic position sensor unit over a first angle and for forming at the location of the magnetic sensor a second magnetic field component having the other multipole order of the two different orders of the multipole expansion. The second magnetic field component may be rotatable relative to the magnetic sensor and relative to the first magnetic field component over a second angle.

However, embodiments of the present invention are not necessarily limited thereto. For example, the first magnetic field component may be fixed relative to the second magnetic field component.

In a position sensor in accordance with embodiments of the present invention, the magnetic assembly may be adapted such that the first magnetic field component is rotatable relative to the magnetic position sensor unit over a first angle and the second magnetic field component is rotatable relative to the first magnetic field component over a second angle. The first angle and the second angle may both depend on the position of the target yet by a different dependency relation. The processor may be adapted for receiving the two signals and for combining them to produce a unique system state representative of the first angle and the second angle.

In a third aspect, the present invention relates to a method for detecting an error, e.g. of a magnetic position sensor unit. The method comprises receiving two signals, e.g. from the magnetic position sensor unit, in which a first signal of the two signals is representative of a physical quantity, e.g. of a position of a target, in a first range and a second signal of the two signals is representative of that physical quantity in a second range. The first range and the second range are different ranges that overlap.

The method comprises detecting an inconsistency between the two signals taking into account the first range and the second range, e.g. by comparing a first value and a second value. The inconsistency is indicative of an error in the magnetic position sensor unit.

The method may comprise comparing the first signal with the second signal after a suitable transformation of either or both of the first signal and the second signal into the first range, into the second range or into a common third range, in which said transformation or transformations take the first range and the second range into account, for example by taking a ratio or a difference of the first range and the second range into account.

The method may comprise calculating a first value, representative of the physical quantity based on the first signal by taking the first range into account, and calculating a second value representative of the physical quantity based on the second signal by taking the second range into account.

In a method in accordance with embodiments of the present invention, the two signals may relate to the position of the target via a different periodicity of the two signals as a function of the position. The first value may represent the position modulo a first period corresponding to the periodicity of the first signal and the second value may represent the position modulo a second period corresponding to the periodicity of the second signal.

In a method in accordance with embodiments of the present invention, the first signal may be a first periodic function of the position and the second signal may be a second periodic function of the position. The first periodic function and the second periodic function may have a same functional form after respectively transforming the position by a first transformation and by a second transformation. The first transformation and the second transformation may correspond to a scaling of the position, e.g. optionally after applying an offset, in which a multiplicative factor corresponding to the scaling, optionally also an offset term corresponding to the offset, may differ between the first transformation and the second transformation.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
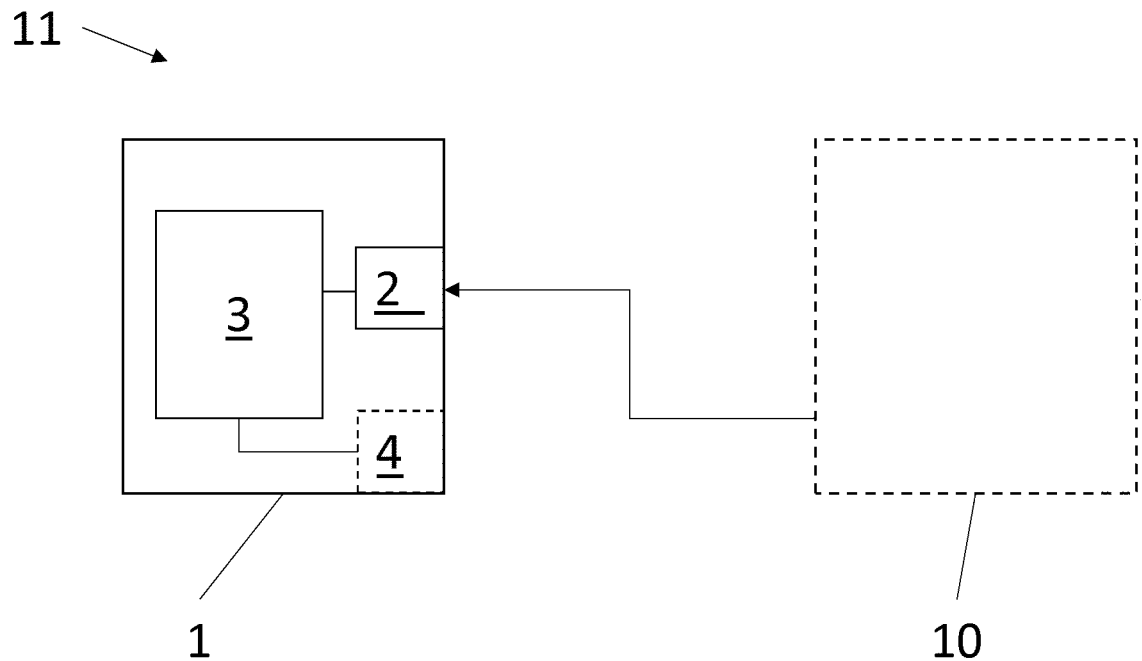
FIG. 1 shows an integrated circuit in accordance with embodiments of the present invention in a position sensor in accordance with embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to an integrated circuit for error detection, e.g. of an error occurring in a magnetic position sensor unit, e.g. a linear and/or angular position sensor comprising sensing elements for sensing at least one property of a magnetic field indicative of the position to be determined by the sensor unit. The integrated circuit comprises an input for receiving two signals, e.g. from the magnetic position sensor unit. A first signal of the two signals is representative of a physical quantity, e.g. a position of a target, in a first range and a second signal of the two signals, i.e. the other signal, is representative of the physical quantity in a second range, wherein the first range and the second range are different ranges that overlap. The integrated circuit comprises a processor configured to detect an inconsistency between the two signals by taking said first and second range into account, said inconsistency being indicative of an error.

In a second aspect, the present invention relates to a position sensor for determining a position of a target, e.g. an angular and/or linear position. The position sensor comprises an integrated circuit in accordance with embodiments of the first aspect of the present invention and the magnetic position sensor unit for generating the two signals and for providing the two signals to the integrated circuit via the input.

Referring to FIG. 1, an integrated circuit 1, in accordance with embodiments of the present invention, for error detection, for example of an error occurring in a magnetic position sensor unit 10, is shown. The magnetic position sensor unit 10 may be a linear (or curvilinear) and/or angular position sensor that comprises sensing elements for sensing at least one property of a magnetic field indicative of the position to be determined by the sensor unit. As known in the art, the position sensor unit may be adapted for determining a relative position between a first element and a second element, e.g. between a stator part and a rotor part. The relative position may affect a magnetic field such that the position may be determined by sensing a property or properties of the magnetic field, and analysing the signal(s) obtained by this sensing.

The integrated circuit 1 may be operably connected (or connectable) to the magnetic position sensor unit 10. The integrated circuit 1 may be a device external to the sensor unit or may be integrated in the sensor unit.

The integrated circuit 1 comprises an input 2 for receiving two signals, for example from the magnetic position sensor unit. These signals may be digital and/or analog signals. The signals may be obtained simultaneously via the input, e.g. as signals provided in parallel, or may be obtained consecutively via the input, e.g. by temporally alternating the signal source. The integrated circuit 1 may be cointegrated with the magnetic position sensor unit 10, such that the input 2 may exist in a physical electrical connection between sensing elements and the integrated circuit and/or as an intermediate stored digital entity during digital processing, e.g. by a digital storage memory or register for making the signals available to the integrated circuit.

A first signal of the two signals is representative of a physical quantity, such as a position of a target, in a first range and a second signal of the two signals, i.e. the other signal, is representative of the physical quantity, e.g. the position of the target, in a second range. The first range and the second range are different ranges that overlap. Thus, at least in the subrange where both ranges overlap, the position of the target may be determined based on either signal (and/or both signals).

The two signals may relate to the physical quantity, e.g. the position of the target, via a different periodicity of the two signals as a function of the physical quantity, e.g. as a function of an input coordinate or input angle indicative of respectively the target's relative position and/or orientation with respect to a reference frame, e.g. relative to a static part of the sensor unit. For example, each of the two signals may be periodic as function of the physical quantity. Each of the two signals may be a periodic function of the physical quantity, e.g. of the coordinate or angle of the target. Furthermore, the periods of these periodic functions may differ between the two signals.

Each signal may provide information about the physical quantity within a period of the periodic range, e.g. the position may be determined up to an additive term formed by an integer multiple of the period, e.g. the position modulo the period may be determined, in which for each of the two signals a different period applies.

Thus, even though both ranges are not the same, e.g. the periodic functions may differ in at least the periods thereof, both signals are indicative of the same physical quantity, e.g. a same position of the same target, and therefore are interrelated, e.g. correlated. For example, both periodic functions measure the same physical quantity, e.g. the same position.

For example, each of the two signals may change as a function of the position of the target. Furthermore, both periodic functions $f_1$, $f_2$ may relate to a same functional expression form $f(x)$, where x may be a transformed version of the position variable, e.g. a scaled and/or shifted version of the position variable. For example, both periodic functions may differ only in a different period $R_1$, $R_2$ as function of the position r, e.g. such that $f(x)=f_1(r/R_1)=f_2(r/R_2)$. Additionally, both periodic functions may also differ in an offset position $D_1$, $D_2$, e.g. such that $f(x)=f_1((r-D_1)/R_1)=f_2((r-D_2)/R_2)$.

The first range may be an integer or non-integer multiple of the second range (or, obviously, vice versa), e.g. the period of the periodic function corresponding to the first signal may be an integer multiple of the period of the periodic function corresponding to the second signal, e.g. $R_1=k \cdot R_2$ where k is selected from the set of all strict positive integers, 1, 2, 3, . . . . However, embodiments are not limited thereto.

Since both signals depend differently on the physical quantity, e.g. the position of the target, a robust fault detection may be advantageously provided by embodiments of the present invention. For example, an external factor that would disturb both signals in the same manner, e.g. by a same additive term or multiplicative factor, could still lead to an inconsistency due to the different functional relationship with respect to the position.

For example, if both periodic functions also differ in the offset positions $D_1$, $D_2$, there would exist always a known position difference between measurement values determined from respectively the first and the second signal before correcting for the offsets. Therefore, the fault detection may advantageously be further improved, e.g. improved in robustness. For example, at a static angular target position of 0°, if one of the signal chains outputting the first or second angle is defective, e.g. such that they output always equals 0°, it would not be detected without an offset position. However, if an artificial angular difference exist between both angles, due to the offsets, this situation can be detected.

The integrated circuit 1 comprises a processor 3 for detecting an inconsistency between the two signals by taking the first and/or second range into account, in which this inconsistency is indicative of an error.

The processor may be configured to compare the first signal with the second signal after a suitable transformation of either or both of the first signal and the second signal into the first range, into the second range or into a common third range. The transformation or transformations take the first range and/or the second range into account, for example by taking a ratio and/or a difference of the first range and the second range into account or for example by taking a ratio and/or a difference of the first and/or second range and the first and/or the second signal.
which may be configured to calculate a first value representative of the physical quantity based on the first signal, by taking the first range into account. The processor may also be configured to calculate a second value representative of the physical quantity based on the second signal, by taking the second range into account.

The processor 4 may be adapted for determining the physical quantity in the form of a position.

The processor 4 may be adapted for determining the position of the target in the form of a linear or curvilinear displacement, along a predetermined path, with respect to a reference point, e.g. a coordinate origin.

The processor 4 may be adapted for determining the position of the target in the form of an angle. For example, the integrated circuit may determine an angular position of the target, e.g. an orientation of the target, based on the first and the second signal. For example, the first signal may determine the position in a range of 360°, e.g. by sensing a dipole magnetic field in the magnetic position sensor unit, and the second signal may determine the position in a range of 180°, e.g. by sensing a quadrupole magnetic field in the magnetic position sensor unit.

The processor 4 may be adapted for determining the position of the target by taking both the first and the second value into account, e.g. such as to increase the accuracy of the determined position relative to either one of the first value and the second value and/or such as to increase a range in which the position of the target can be accurately determined.

For example, the processor 4 may be adapted for determining the position in the form of an angle in an angular range that represents a single full rotation, e.g. 360°. For example the first range may be a range of 360° and the second range may be integer fraction of the first range, e.g. 180°.

The processor 4 may be adapted for determining the position in the form of an angle in an angular range that exceeds a single rotation, e.g. over multiple rotations. The two signals may be combined, e.g. jointly used in a calculation to determine de multi-turn angle, such that the angle can be determining in a range exceeding 360°, while still allowing an accurate measurement of the angle.

The processor 3 may also be configured to detect an inconsistency between the two signals by comparing the first value and the second value, in which this inconsistency is indicative of the error, e.g. an error in the magnetic position sensor unit.

For example, the inconsistency may be detected when (e.g. if and only if) an absolute difference between the first value and the second value exceeds a predetermined threshold indicative of an (statistical) error margin on the position under normal operating conditions.

The integrated circuit 1 may comprise an output 4. The processor 3 may be adapted for generating a fault signal and making the fault signal available (e.g. to an external controller, processor and/or observer) via the output 4. The fault signal may be generated when the inconsistency is detected.

FIG. 1 also shows a position sensor 11 in accordance with embodiments of the present invention. The position sensor comprises an integrated circuit 1 in accordance with embodiments for the present invention and a magnetic position sensor unit 10 for generating the two signals and for providing the two signals to the integrated circuit 1 via the input 2.

The integrated circuit 1 and the sensor unit 10 may be integrated into a single integrated circuit device. For example, state-of-the-art integrated circuit technology allows the integration of magnetic sensors and suitable readout circuitry, such as angle and/or linear position calculation electronics, on a single chip.

However, embodiments of the present invention are not limited thereto. For example, the position sensor 11 may comprise a plurality of magnetic position sensor units 10. For example, the two signals may be provided by two magnetic position sensor units, respectively, in which the magnetic position sensor units are configured to sense signals relating to the same position of the target, yet in different position ranges.

Furthermore, the first signal and the second signal may be provided by readout electronics that combines a plurality of sensor signals, e.g. a different combination of the same sensor signals for each of the two signals.

Also, the first signal and the second signal may be provided by different readout electronics circuits, each processing the sensor signals provided by a same magnetic position sensor unit, by a sensor unit corresponding to the readout electronics circuits, or by a plurality of magnetic position sensor units.

Thus, the two signals may relate to the same sensors, partially the same sensors or different sensors. The two signals may relate to the same readout electronics circuit, partially the same readout electronics circuit or different readout electronics circuits.

The position sensor may, for example, be an angular position sensor comprising a rotor part and a stator part.

The position sensor may also be a linear position sensor. Furthermore, embodiments are not necessarily limited to sensors for exclusively determining only an angular position or for exclusively determining only a linear position.

In a position sensor 11, the magnetic position sensor unit 10 may comprise a magnetic sensor for detecting (at least) two different orders of a multipole expansion of a magnetic field and for generating the two signals as indicative of the two different orders of that multipole expansion.

The two different orders refer to different orders in the sense of a multipole expansion of the magnetic field, e.g. a mathematical multipole decomposition, for example a Laplace expansion in solid spherical harmonic functions. In other words, the different order may refer to a different order of multipole expansion terms. Furthermore, the first order and the second order do not necessarily refer to the first order expansion term and the second order expansion term of such multipole expansion, but rather to two different order expansion terms that are identified by 'the first' and 'the second' for the sake of clarity in referring to a specific one of these two different multipole orders.

For example, examples are provided in the present description in which the first multipole order is a dipole order, and the second multipole order is a quadrupole order. However, embodiments of the present invention are not necessarily limited thereto.

The magnetic position sensor unit 10 may include means for sensing the different magnetic field components to produce the first and the second signal. The processor 3 may be adapted for receiving the first and second signals and for combining them to produce a unique position indicative of the position of the target.

However, in other embodiments of the present invention, the magnetic position sensor unit 10 is not necessarily adapted for detecting different orders of a multipole expansion of the magnetic field, e.g. for disambiguating the contributions of a dipole and a quadrupole magnetic field to the total magnetic field that is observed. For example, the first and second signal may be provided by different signal processing and sensor readout provided by at least one readout circuit, yet based on the same sensor signals provided by the same sensors. For example, a sensor may provide a 360° signal periodicity based on one method of readout and/or processing of the sensors signals, while providing a 180° signal periodicity by reading out and/or processing the same sensor signals differently.

For example, in a position sensor 11, the magnetic position sensor unit 10 may comprise a plurality of Hall sensing elements for measuring magnetic field properties, e.g. magnetic field strengths, at a plurality of locations and/or in a plurality of orientations, e.g. for sensing a plurality of different magnetic field components, such as the different multipole orders, but not necessarily limited thereto. For example, the magnetic position sensor unit 10 may have the plurality of Hall elements disposed at a surface of the magnetic position sensor unit. The electrical output of the Hall sensing elements may be combined, e.g. linearly combined, to produce the first and second signals. The Hall elements may be sensitive to a magnetic field that is perpendicular to the surface, or parallel to the surface or a combination thereof.

It is known in the art that specific arrangements of a plurality of Hall sensing elements, e.g. vertical and/or horizontal Hall elements, may offer various advantages. The supporting electronics, e.g. a readout circuit and/or the processor 3, may combine a more accurate measurement in a limited range with a less accurate measurement in a wider range to achieve an accurate measurement over a wide range, The supporting electronics may also combine various measurements such as to reduce or remove a systematic error due to the presence of an external magnetic field (e.g. a "Fremdfeld"), as is known in the art.

Alternatively or additionally, in a position sensor 11, the magnetic position sensor unit 10 may comprise inductive sensor elements, such as induction coils, for (indirectly) measuring, via the measuring of properties of induced electric currents in the inductive sensor elements, magnetic field properties at a plurality of locations and/or in a plurality of orientations, e.g. for sensing a plurality of magnetic field components.

Alternatively or additionally, in a position sensor 11, the magnetic position sensor unit 10 may comprise other magnetic sensing elements, such as giant magnetoresistance (GMR) sensing elements, anisotropic magnetoresistance (AMR) sensing elements and/or tunnel magnetoresistance (TMR) sensing elements.

The processor 3 may be adapted for determining the position of the target based on the (directly and/or indirectly) measured magnetic field property or properties.

Figure 2:
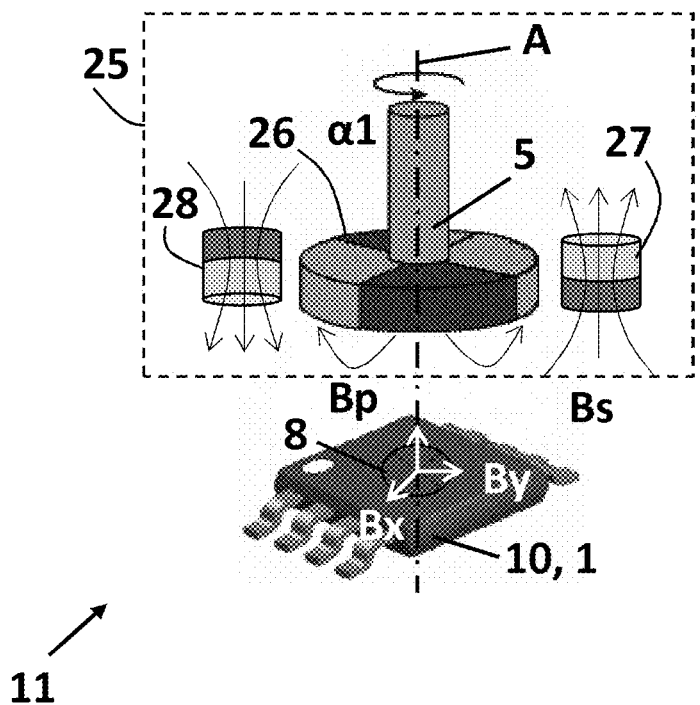
FIG. 2 shows an exemplary position sensor in accordance with embodiments of the present invention.

Referring to FIG. 2, in embodiments of the present invention, the sensor unit may comprise a magnetic assembly 25. The magnetic assembly 25 may comprise a permanent magnet. However, the magnetic assembly does not necessarily comprise a permanent magnet, but may also comprise another type of magnetic field source. For example, the magnetic assembly may comprise an arrangement of coils and a magnet controller. In the latter embodiments, the magnetic field assembly may have two or more magnetic poles of different magnitudes and the magnet controller may provide different voltages to the current to the coils to form poles of different magnitudes.

The position sensor may, for example, be an angular position sensor comprising a rotor part and a stator part. The magnetic assembly may be attached to a rotor and a monolithically integrated sensor (e.g. comprising the magnetic position sensor unit 10 and the integrated circuit 1) may be attached to a stator.

The magnetic assembly 25 may be arranged such that it forms a magnetic field having at least two magnetic field components with different angular periodicities at the location of the magnetic sensor.

The magnetic assembly 25 may be adapted for forming, at the location of the magnetic position sensor unit 10, a first magnetic field component having a first multipole order that corresponds to one of the two different orders of the multipole expansion that is detectable by the magnetic sensor.

The processor 3 may be adapted for receiving the first and second signals and for combining them to produce a unique angular position of the magnetic assembly relative to the sensor.

The first magnetic field component and the second magnetic field component may be fixed in position and orientation with respect to each other, but may be rotatable and/or movable with respect to a static part of the device, e.g. such that this rotation and/or movement is driven by the target for which the position is being determined. However, the first magnetic field component and the second magnetic field component may also be not fixed in position or orientation with respect to each other, and each component may be rotatable and/or movable with respect to a static part of the device, e.g. such that each rotation and/or movement is driven, e.g. separately, by the target.

The first magnetic field component may be rotatable relative to the magnetic sensor over a first angle. The magnetic assembly may be adapted for forming, at the location of the magnetic sensor, a second magnetic field component having a second multipole order, different from the first multipole order and corresponding to the other of the two different orders of the multipole expansion. The second magnetic field component may be rotatable relative to the magnetic sensor and relative to the first magnetic field component over a second angle.

The first angle and the second angle may relate via a same or a different relationship, e.g. a same or a different linear relation, to the position, e.g. angle, of the target to be determined.

Furthermore, the processor 3 may be adapted for receiving the two signals and for combining them to produce a unique system state representative of the first angle and the second angle. For example, the unique system state may be representative for the angular position of the target, e.g. in an angular range exceeding 360°, e.g. a multiturn angular position. For example, predetermined transmission ratios between the first angle and the angular position of the target and between the second angle and the angular position of the target may be taken into account for determining the unique system state.

The processor 3 may be adapted for calculating, based on the first signal, e.g. indicative of a first order magnetic field of the at least two different order magnetic fields, a first value representative of an angle, e.g. of the first angle. For example, the first order magnetic field may be a quadrupole magnetic field. Thus, an angle of rotation of the quadrupole magnet may be determined in a range of 180°, e.g. due to the rotational symmetry of the quadrupole magnetic field.

The processor 3 may be adapted for calculating, based on the second signal, e.g. indicative of a second order magnetic field of the at least two different order magnetic fields, a second value that is representative of another angle, e.g. of the second angle. For example, the second order magnetic field may be a dipole magnetic field. The second angle of rotation may comprise a relative angle between a quadrupole magnetic field generated by a first magnetic assembly and a dipole magnetic field provided by a second magnetic assembly. Both the first magnetic assembly and the second magnetic assembly may be mechanically coupled to the target, e.g. such that the first and the second value are both indicative of the position of the target.

The processor may be adapted for calculating, based on the first value and the second value, a segment of the angular position of the target. For example, calculating this segment may comprise a rounding-off of a multiplication of a multiplicative factor and the relative angle between a quadrupole magnetic field and a dipole magnetic field, in which this multiplicative factor is predetermined by the geometrical configuration of a second magnetic assembly and the symmetry of the field generated by the first magnetic assembly.

The segment may correspond to an integer value of the number of segments the shaft is rotated with respect to a reference position, e.g. a multiangle of 0°, in which each segment is representative of a single period of the angular symmetry of the magnetic field generated by the first magnetic assembly 3, e.g. of a 180° segment of the multiturn angle. Thus, the processor may be adapted for calculating the multiturn angle by multiplying the determined segment by the period of the angular symmetry of the magnetic field directly generated by the first magnetic assembly 3, e.g. by 180° for a quadrupole magnet, and adding the first angle to this multiplication product.

The processor 3 is adapted for detecting an inconsistency between the at least two signals. For example, for predetermined gear transmission ratios relating respectively the first angle and the second angle to an input angle of an input shaft, i.e. to the position of the target, both signals may relate to the same input angle via a different functional relation. For example, a different periodicity of both signals as a function of the input angle may allow the processor to determine the input angle over a range that exceeds a single rotation, e.g. over multiple rotations, while still allowing an accurate measurement of the angle. However, where an integer value of the number of segments the shaft is rotated with respect to a reference position is calculated by the processor to indicate the segment of the multiturn angle, a remainder of this integer rounding-off, e.g. the decimal part of said multiplication can be cross-checked for consistency with the first angle determined by the processor. For example, the processor can be adapted for checking wither the first angle lies within a validation range determined by this remainder. It is an advantage of embodiments of the present invention that functional safety can be improved by checking the consistency between two independently measured angular measurements that are related by different functional relationships to a common multiturn input angle, e.g. without requiring an additional chip.

Referring to FIG. 2, a position sensor 11 in accordance with embodiments of the present invention may comprise a magnetic assembly 25. The magnetic assembly 25 may form a magnetic field having at least two magnetic field components with different angular periodicities at the location of the magnetic position sensor unit 10.

For example, the magnetic assembly may comprise a quadrupole 26, e.g. a regular quadrupole, and a single dipole 27, e.g. a single cylindrical dipole. The magnetic assembly may also comprise a quadrupole 26 and a pair of dipoles 27,28. For example, the pair of dipoles may be identical cylindrical dipoles locates on opposite sides of the rotation axis, at a same distance from the rotation axis and oriented in opposite directions. A primary magnetic field Bp may be generated by the quadrupole, while a secondary magnetic field Bs may be generated by the dipole(s).

Thus, a quadrupole field Bp and a dipolar field Bs may be measured by the magnetic position sensor unit 10. While both fields may be superimposed, e.g. forming a total magnetic field by summation, acquiring sensor measurements at different positions and/or in different orientations (i.e. sensitive to differently oriented field components) may allow a separation of both contributions, e.g. by a suitable processing as known in the art to generate a first signal representative of a property of the quadrupole field contribution and a second signal representative of a property of the dipole field contribution. The quadrupole and dipole fields may be both representative of the angular position of the target. In this example, the signal generated as representative of the quadrupole field may have a range of 180°, e.g. the signal may be periodic as function of the angle with a period of 180°, and the signal generated as representative of the dipolar field may have a range of 360°, e.g. the signal may be periodic as function of the angle with a period of 360°.

For example, if the rotor is linked to the target such that a 1-to-1 angular correspondence exists, i.e. such that a unit angle rotation of the target implies a same unit angle rotation of the rotor, the first signal (associated with the quadrupole field) may be used to determine the angular position of the target modulo an integer multiple of 180° and the second signal (associated with the dipole field) may be used to determine the angular position of the target modulo an integer multiple of 360°.

The magnetic position sensor unit 10 may comprise a plurality of primary sensor elements, e.g. Hall sensors, arranged on a circle. For example, eight sensor elements may be uniformly distributed over the circle, e.g. at 45° intervals.

The quadrupole and dipole(s) may be arranged in a configuration with fixed relative positions and orientations of the magnets with respect to each other. A rotation axis A of a rotor 5, e.g. connected to the target such that a rotation of the target over an angle to be determined is associated with a rotation of the rotor, may pass through the center of the quadrupole 26 and through the center of a circle 8 upon which sensor elements are located.

Figure 3:
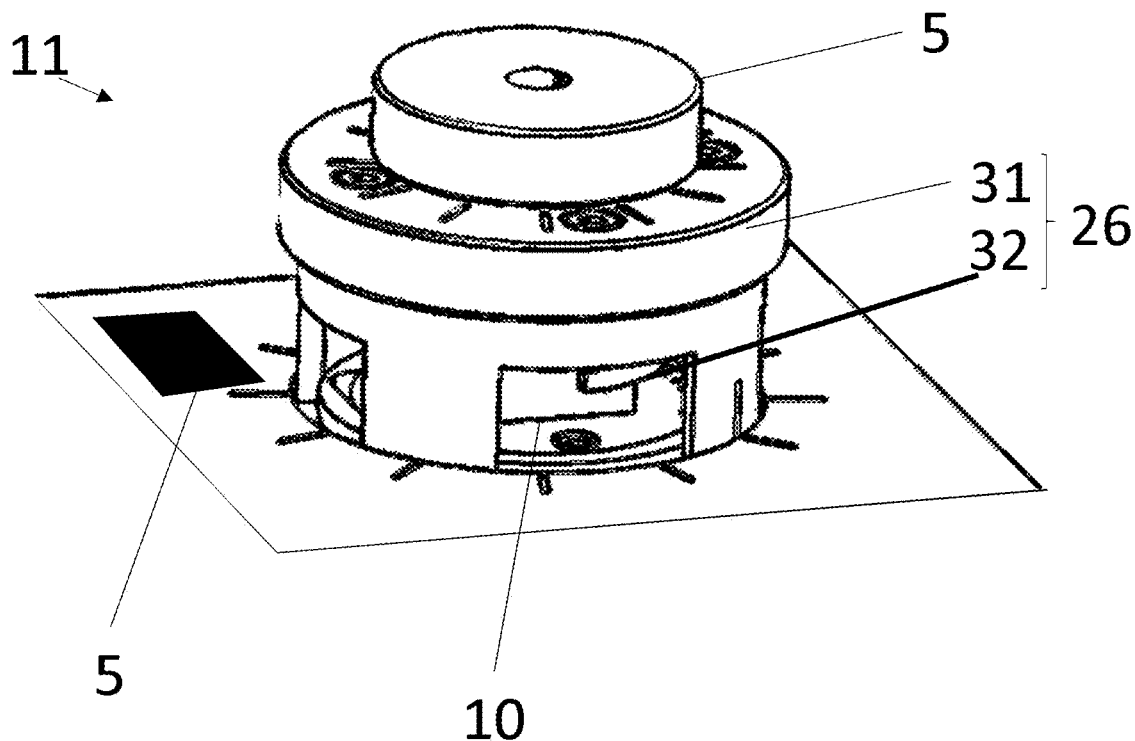
FIG. 3 shows another exemplary position sensor in accordance with embodiments of the present invention.

Referring to FIG. 3, a position sensor 11 in accordance with embodiments of the present invention may be adapted for sensing a rotary position of a shaft over an angular range that exceeds 360°, e.g. an angular position representative of an angle and a number of revolutions of the shaft.

The rotary position sensor comprises a magnetic position sensor unit 10, which may be adapted for detecting at least two different order magnetic fields and for generating at least two independent signals indicative of the at least two different order magnetic fields. For example, the magnetic sensor may be adapted for detecting at least a dipole magnetic field and a quadrupole magnetic field, and generating independent signals indicative of the dipole magnetic field and the quadrupole magnetic field.

The rotary position sensor may also comprise a magnetic assembly 26 for forming a magnetic field component having a first multipole order at the location of the magnetic sensor. The first magnetic field component is rotatable relative to the magnetic sensor by receiving a first angle. The magnetic assembly is also adapted for forming a second magnetic field component having a second multipole order, different from the first multipole order, at the location of the magnetic sensor. The second magnetic field component is rotatable relative to the magnetic sensor and relative to the first magnetic field component by receiving a second angle.

For example, such magnetic assembly may comprise a first magnetic assembly 31, e.g. a first magnetic assembly part, forming the first magnetic field component having the first multipole order at the location of the magnetic sensor. The first magnetic assembly may be adapted for being rotated relative to the magnetic sensor by receiving the first angle. For example, the first magnetic assembly may be connected to a rotor 5 for rotating in a plane parallel to a detection surface of the magnetic position sensor unit 10.

The first magnetic assembly 31 may comprise a multipole magnet, such as a quadrupole magnet for forming a quadrupole magnetic field, e.g. the first magnetic field component having the first multipole order may be a quadrupole magnetic field. For example, the first magnetic assembly may comprise four magnet bars arranged in a cross, where the orientation of poles of adjacent magnet bars alternate.

The magnetic assembly may comprise a second magnetic assembly 32, e.g. a second magnetic assembly part, for producing the second magnetic field component having the second multipole order, different from the first multipole order, at the location of the magnetic position sensor unit 10.

For example, the second magnetic assembly 32 may comprise a dipole magnet for generating a dipole magnetic field at the location of the magnetic sensor, while the first magnetic assembly 31 may comprise a quadrupole magnet for generating a quadrupole magnetic field at the location of the magnetic position sensor unit 10.

For example, the first magnetic field component having the first multipole order, e.g. a quadrupole magnetic field, may have a higher order than the second magnetic field component having the second order, e.g. a dipole magnetic field.

In accordance with embodiments of the present invention, the second magnetic assembly 32 may comprise a magnetic flux concentrator. The magnetic flux concentrator may locally change the magnetic field configuration of the magnetic field generated by the first magnetic assembly 31, such that a magnetic field component of a different order, e.g. the second magnetic field component having the second order, is observed by the magnetic sensor, e.g. a dipole magnetic field superimposed on the quadrupole magnetic field generated by the first magnetic assembly 31.

For example, the magnetic flux concentrator may be adapted for angularly shifting part of the magnetic field of the first magnetic assembly 31 from a first angular range to a second, different, angular range when comparing the field generated by the first magnetic assembly in a first region near the first magnetic assembly 31 to the modified field in a second region near the magnetic position sensor unit, in which this shift forms a field of a different order than the field directly generated by the first magnetic assembly 31, e.g. a different multipole order, such as a dipole magnetic field where the first magnetic assembly generates a quadrupole field.

The second magnetic assembly 32 may be adapted for being rotated relative to the magnetic position sensor unit 10 and relative to the first magnetic assembly 31 by receiving a second angle. The first magnetic assembly 31 and the second magnetic assembly 32 may be adapted for respectively receiving the first angle and the second angle from a common shaft in accordance with predetermined transmission ratios that are different for the first angle and the second angle. For example, the first magnetic assembly 3 may have an angular periodicity of the magnetic field, e.g. a periodicity having an angular period of 180°, while the second magnetic assembly 4 may generate a field having a different angular periodicity.

For example, the first angle may be related to an input angle of the input shaft via a first transmission ratio $r_1$. For example, this first transmission ratio may express an increment of the first angle caused by a unit increment of the input angle. The second angle may be related to the input angle of the input shaft via a second transmission ratio $r_2$. For example, this second transmission ratio may express an increment of the second angle caused by a unit increment of the input angle.

Figure 4:
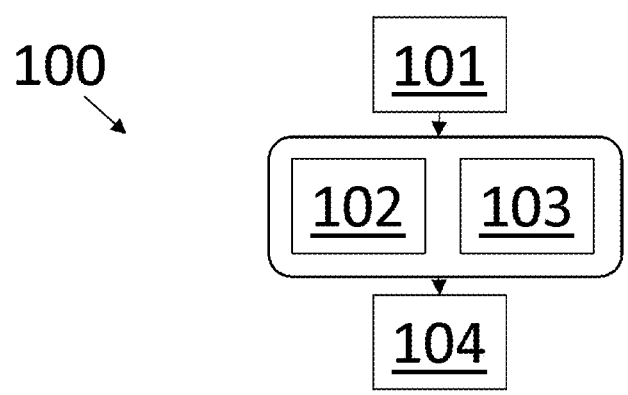
FIG. 4 illustrates a method in accordance with embodiments of the present invention.

In a third aspect, the present invention also relates to a method for error detection, e.g. in a magnetic position sensor unit. Referring to FIG. 4, an exemplary method 100 in accordance with embodiments of the present invention is shown.

The method 100 comprises receiving 101 two signals, e.g. from the magnetic position sensor unit, in which a first signal of the two signals is representative of a physical quantity, such as a position of a target, in a first range and a second signal of the two signals is representative of that physical quantity in a second range. The first range and the second range are different ranges that overlap.

Receiving 101 the two signals may comprise generating the two signals using a magnetic position sensor unit, e.g. as described hereinabove.

The two signals may relate to the position of the target via a different periodicity of the two signals as a function of the position.

The first signal may relate to the position of the target by a first periodic function of the position, and the second signal may relate to the position of the target by a second periodic function of the position.

The first periodic function and the second periodic function may have a same functional form, e.g. a function f(x), after respectively transforming the position of the target by a first transformation and by a second transformation.

The first transformation and the second transformation may correspond to a scaling of the position of the target after applying an offset. A multiplicative factor corresponding to the scaling and an offset term corresponding to the offset may both differ between the first transformation and the second transformation.

The method comprises detecting an inconsistency between the two signals by taking the first and/or second range into account, in which this inconsistency is indicative of an error.

Detecting the inconsistency may comprise comparing the first signal with the second signal after a suitable transformation of either or both of the first signal and the second signal into the first range, into the second range or into a common third range. The transformation or transformations may take the first range and/or the second range into account, for example by taking a ratio or a difference of the first range and/or the second range into account or for example by taking a ratio and/or a difference of the first and/or second range and the first and/or the second signal.

The method may comprise calculating 102 a first value representative of the position of the target based on the first signal and taking the first range into account.

The first value may represent the position of the target modulo a first period that corresponds to the periodicity of the first signal.

Calculating the first value may comprise applying the inverse function of the first periodic function (e.g. restricted to a representative period to allow the inversion of the function). For example, calculating the first value may comprise applying the inverse function of the function f(x) and applying the inverse of the first transformation to the result.

The method may comprise calculating 103 a second value representative of the position of the target based on the second signal by taking the second range into account.

The second value may represent the position of the target modulo a second period corresponding to the periodicity of the second signal.

Calculating the second value may comprise applying the inverse function of the second periodic function (e.g. restricted to a representative period to allow the inversion of the function). For example, calculating the second value may comprise applying the inverse function of the function f(x) and applying the inverse of the second transformation to the result.

Detecting 103 the inconsistency between the two signals may comprise comparing the first value and the second value, in which the inconsistency is indicative of an error in the magnetic position sensor unit.

The invention claimed is:

1. A position sensor for determining a position of a target, said position sensor comprising:
 an integrated circuit for error detection, and
 a magnetic position sensor unit configured to
  detect two different orders of a multipole expansion of a magnetic field at the location of the magnetic position sensor unit,
  generate two signals indicative of the two different orders of the multipole expansion, and
  provide said two signals to the integrated circuit via an input thereof,
 the integrated circuit including
  said input for receiving two signals, in which a first signal of said two signals is representative of a physical quantity in a first range and a second signal of said two signals is representative of said physical quantity in a second range, wherein said first range and said second range are different ranges that overlap, and
  a processor configured to detect an inconsistency between the two signals by taking said first and second range into account, said inconsistency being indicative of an error.

2. The position sensor of claim 1, wherein said processor is configured to compare the first signal with the second signal after a suitable transformation of either or both of the first signal and the second signal into the first range, into the second range or into a common third range, in which said transformation or transformations take the first range and/or the second range into account.

3. The position sensor of claim 1, wherein said processor is configured to calculate a first value representative of said physical quantity based on said first signal by taking said first range into account and to calculate a second value representative of said physical quantity based on said second signal by taking said second range into account.

4. The position sensor of claim 3, wherein said processor is adapted for detecting said inconsistency between the two signals by comparing said first value and said second value.

5. The position sensor of claim 4, wherein said processor is adapted to determine said position in the form of an angle in an angular range that exceeds a single rotation.

6. The position sensor of claim 1, wherein said integrated circuit is adapted for error detection of the position sensor unit, wherein said processor is configured to detect said inconsistency as being indicative of an error in said position sensor unit, wherein said input is adapted for receiving said two signals from the position sensor unit, and wherein said physical quantity is a position of a target.

7. The position sensor of claim 1, wherein said two signals relate to said physical quantity via a different periodicity of said two signals as a function of said physical quantity.

8. The position sensor of claim 7, wherein said first value represents said physical quantity modulo a first period corresponding to said periodicity of said first signal and wherein said second value represents said physical quantity modulo a second period corresponding to said periodicity of said second signal.

9. The position sensor of claim 1, wherein the first signal is a first periodic function of the physical quantity and the second signal is a second periodic function of the physical quantity,
 wherein the first periodic function and the second periodic function have a same functional form after respectively transforming the physical quantity by a first transformation and by a second transformation.

10. The position sensor of claim 1, wherein said magnetic position sensor unit comprises a plurality of inductive sensor elements for indirectly measuring, via properties of induced electric currents in said inductive sensor elements, magnetic field properties at a plurality of orientations, and wherein said integrated circuit is adapted for determining said position of the target based on said measured properties of the induced electric currents.

11. The position sensor of claim 1, wherein said magnetic position sensor unit comprises a plurality of Hall elements for measuring magnetic field properties at a plurality of orientations, and
 wherein said integrated circuit is adapted for determining said position of the target based on the measured magnetic field properties.

12. The position sensor of claim 1, wherein said magnetic position sensor unit comprises:
 a magnetic sensor for detecting two different orders of a multipole expansion of a magnetic field and for generating said two signals as indicative of said two different orders of said multipole expansion, and a magnetic assembly for forming at the location of the magnetic sensor a first magnetic field component having a first multipole order of said two different orders of multipole expansion, said first magnetic field component being rotatable relative to the magnetic position sensor unit over a first angle and for forming at the location of the magnetic sensor a second magnetic field component having the other multipole order of said two different orders of said multipole expansion, said second magnetic field component being rotatable relative to the magnetic sensor and relative to the first magnetic field component over a second angle.

13. The position sensor of claim 12, wherein said magnetic assembly is adapted such that said first magnetic field component is rotatable relative to the magnetic position sensor unit over a first angle and said second magnetic field component is rotatable relative to the first magnetic field component over a second angle, wherein said first angle and said second angle both depend on said position of said target yet by a different dependency relation, wherein said processor is adapted for receiving said two signals and for combining them to produce a unique system state representative of said first angle and said second angle.

14. A method for detecting an error, the method comprising:

detecting, using a magnetic position sensor unit, two different orders of a multipole expansion of a magnetic field at the location of the magnetic position sensor unit and generating two signals indicative of the two different orders of the multipole expansion, in which a first signal of the two signals is representative of a physical quantity in a first range and a second signal of the two signals is representative of said physical quantity in a second range, said first range and said second range being different ranges that overlap, and detecting an inconsistency between said two signals by taking said first range and said second range into account, in which said inconsistency is indicative of an error.

* * * * *